April 18, 1950      H. IAMS      2,504,334
PHASE FRONT PLOTTING DEVICE
Filed April 18, 1947      3 Sheets-Sheet 2
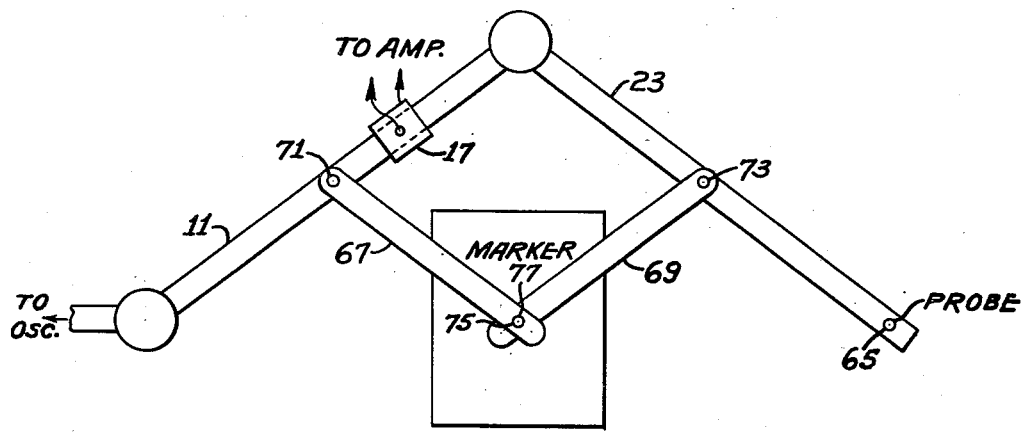
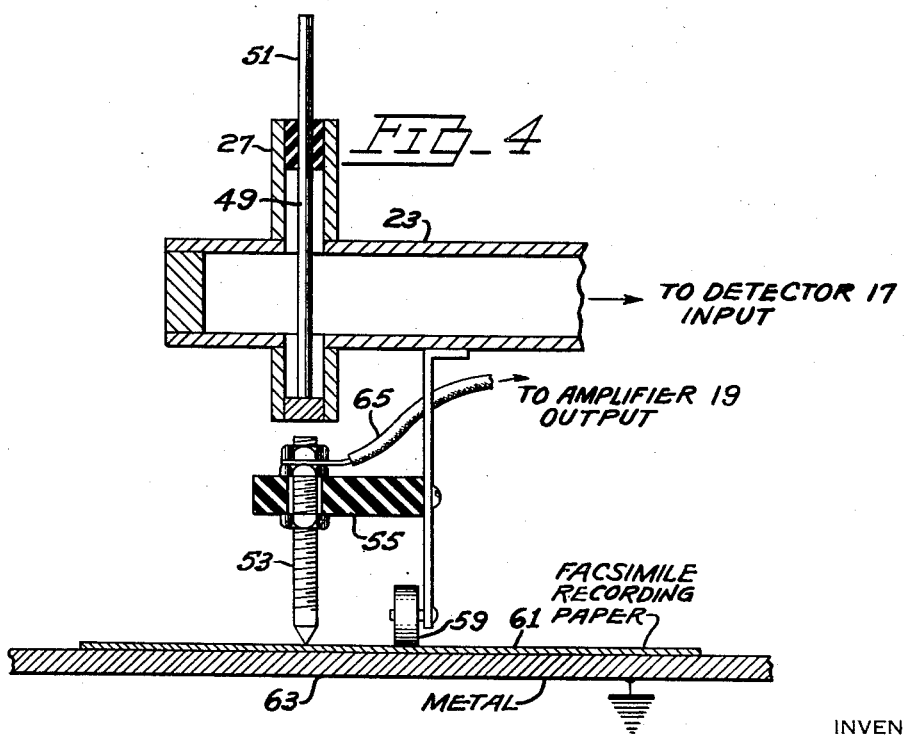
INVENTOR.
Harley Iams
BY
ATTORNEY April 18, 1950 H. IAMS 2,504,334
PHASE FRONT PLOTTING DEVICE
Filed April 18, 1947 3 Sheets-Sheet 3
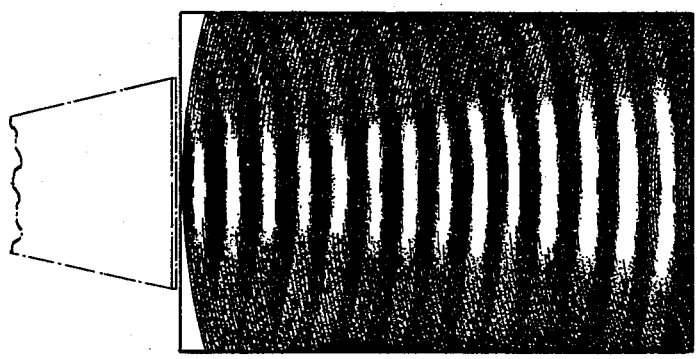
FIG_6
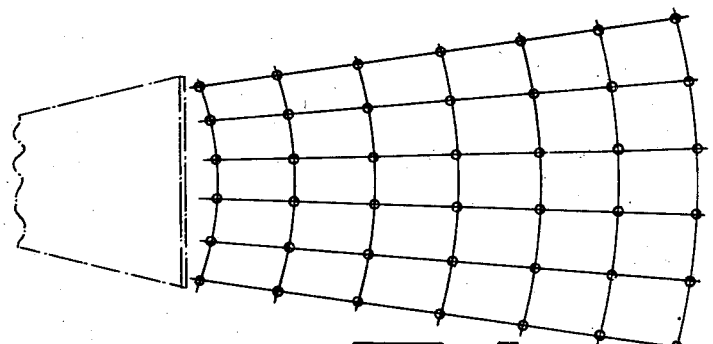
FIG_5
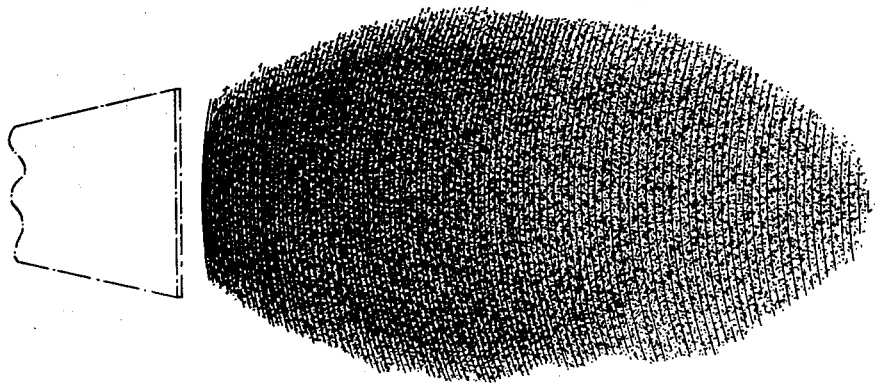
FIG_7
INVENTOR.
Harley Iams
BY
ATTORNEY Patented Apr. 18, 1950

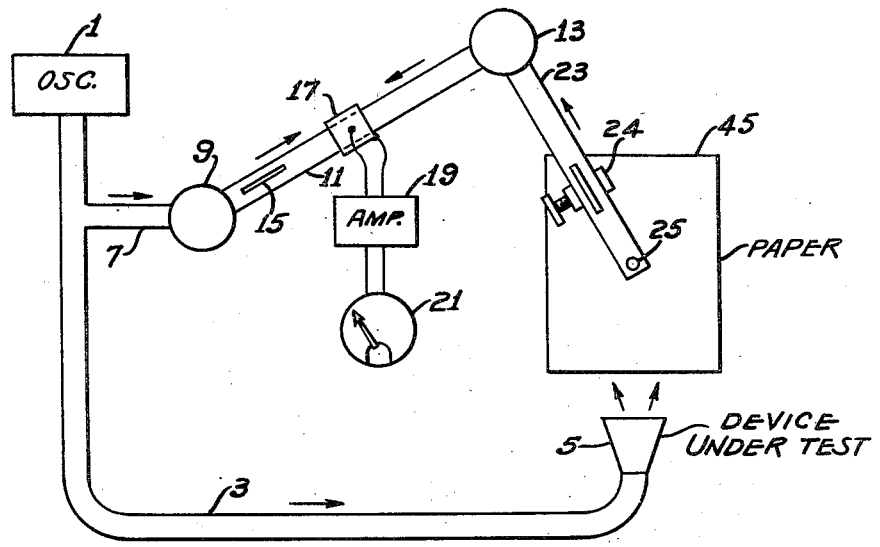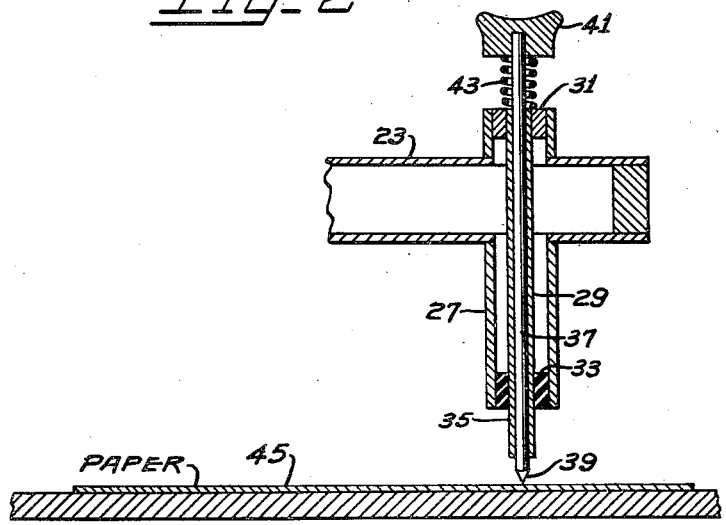

2,504,334

UNITED STATES PATENT OFFICE 2,504,334

PHASE FRONT PLOTTING DEVICE

Harley Iams, Princeton, N. J., assignor to Radio Corporation of America, a corporation of Delaware Application April 18, 1947, Serial No. 742,355

9 Claims. (Cl. 343—100)

This invention relates to improvements in the art of determining and depicting the behavior of ultra high frequency radio waves, and particularly to apparatus for plotting phase fronts in a radio frequency field. Phase front diagrams are equivalent to pictures of radio waves, and are useful in studying the performance of antennas, radio lens systems, and the like. Other information, such as the refractive index of dielectric materials, may be obtained from phase front diagrams.

The term "phase front" as used herein is intended to mean a line extending generally transversely to the direction of energy flow in a field, connecting points at which the time phase of electric vector of the field is the same. A phase front diagram comprises one or more such lines, each line being a locus of points of equal phase.

The invention will be described with reference to the accompanying drawings, wherein:

Figure 1 is a schematic outline drawing of a phase front plotting device embodying the present invention, Figure 2 is a sectional elevation of a field probe and marker structure included in the system of Figure 1, Figure 3 shows a modification of the system of Figure 1 in which the field probe and marker are physically separate and are coupled together by a system of levers, Figure 4 is a sectional elevation of a modified probe and marker, particularly adapted for recording on facsimile paper, Figure 5 is a typical diagram produced by the system of Figure 1 using the marker device of Figure 2, Figure 6 is a phase front diagram produced by the system of Figure 2 using the marker device of Figure 4, and Figure 7 is field intensity pattern, plotted by the system of Figures 1 and 4, for comparison with the phase front diagram of Figure 6.

Refer to Figure 1. An oscillator 1 is connected by a wave guide 3 to the device to be tested, which is in the present example a horn radiator 5. A second wave guide 7 branches from the wave guide 3 and is connected to a rotary joint 9 of the type commonly used for coupling two relatively movable wave guides. A third wave guide section 11 is connected between the rotary joint 9 and a second rotary joint 13. The wave guide section 11 is provided with an attenuator 15 which may be in the form of a plate of poorly-conducting material movable into and out of the guide through a longitudinal slit.

A crystal detector 17 is coupled to and supported by the wave guide 11. The output circuit of the detector 17 is coupled to an amplifier 19. An output meter 21 is provided in the output circuit of the amplifier 19.

A further wave guide section 23 is connected at one of its ends to the joint 13. The other end of the guide 23 carries a probe 25, which may be either of the types shown more clearly in Figure 2 or Figure 4 respectively. The lengths of the various wave guide sections are chosen so that the probe 25 is movable throughout the portion of the field of the device 5 which is of interest. A portion of wave guide 23 is split and a clamp 24 is provided to vary the width of the guide. This permits an adjustment of the phase of the signals reaching detector 17 from probe 25. By such adjustment the recorded phase front can be made to pass through any desired point.

Referring to Figure 2, the probe 25 comprises a coaxial transmission line formed by a tube 27 of conductive material which constitutes the outer conductor and a smaller tube 29 supported therein on insulating bushing 33 and the metal bushing 31. The inner conductor 29 extends within and across the wave guide 23. The lower end portion 35 of the inner conductor 29 extends beyond the outer conductor 27 and acts as a collector antenna. A rod 37 is supported slidably within the tubular inner conductor 29 and is provided with a sharp point 39 at the lower end. The upper end of the rod 37 is provided with a knob or button 41. A compression spring 43 surrounds the upper end of the rod 37, engaging the button 41 and the bushing 31 to urge the rod 37 upward.

In the operation of the described device a sheet 45 of paper or similar material is supported in the field of the device 5, substantially in the plane in which the phase front diagram is determined. The device 5 is energized through the wave guide 3 in the oscillator 1. The oscillator 1 may be of the continuous wave type, or may be pulsed or otherwise modulated in order that the detector 17 will provide an A.-C. signal suitable for amplification by an ordinary audio amplifier. A portion of the output of the oscillator 1 is applied to the detector 17 through the wave guide section 11. The attenuator 15 is adjusted so that the amplitude of this energy is approximately equal to that picked up at the probe 25 in the field of the radiator 5.

The probe is moved over the paper 45 to a point where the energy arriving at the detector 17 from the probe 25 is either in phase or 180 degrees out of phase with that arriving at the detector 17 through the wave guide section 11. This condition is indicated by the meter 21 which will exhibit a maximum deflection when the two inputs to the detector 17 are in phase or minimum deflection when they are out of phase. Either the in phase or out of phase condition may be used to indicate a phase front. Supposing the in phase condition is selected. The probe 25 is then moved to a position which causes the meter 21 to deflect to a maximum extent. At this point the button 41 is pressed causing the pointed end 39 of the rod 37 to penetrate the paper 45.

The probe 25 is then moved to another reasonably nearby point which again provides maximum deflection of the meter 21, and another mark is made on the paper by the point 39. This process is continued point by point at sufficiently small intervals to establish the positions of one or more phase fronts in the field picked up by the probe. The resulting appearance of the paper is illustrated in Figure 5, where lines have been drawn connecting the points of equal phase. It will be observed that the phase front lines in Figure 5 appear to be curved more or less about a common center point. This point is the effective center of radiation of the horn 5. When the horn is used to illuminate a lens or reflector, this effective center should be placed at the focus, in order that the sharpest possible beam shall be formed.

A substantially continuous record, rather than the point-by-point diagram of Figure 5, may be made by the modified probe and marker structure shown in Figure 4. As in the device of Figure 2, the probe includes a coaxial transmission line section with its inner conductor 49 extending across the inside of the wave guide 23. The upper end portion 51 of the conductor 49 extends beyond the upper end of the outer conductor 27. The marker is a rod 53 of conductive material supported on an insulating block 55 which is secured to the wave guide 23 by a bracket 57.

A roller 59 is provided on the bracket 57 to support the structure on a sheet 61 of current-sensitive paper like that used in facsimile recorders. The paper 61 is spread on a flat metal plate 63. The lower end of the rod 53 is pointed, and this point is maintained in contact with the paper 61. The rod 53 is connected by a wire 65 to one of the output terminals of the amplifier 19, the other output terminal being grounded to the plate 63.

With the device of Figure 4 incorporated in the system of Figure 1, the exposed portion 51 of the conductor 49 acts as a collector antenna. Its output is mixed in the detector 17 with energy taken directly from the oscillator 1, and the resulting output from the detector is amplified and applied to the marker 53 and the plate 63. Current flowing through the paper 61 from the marker 53 to the plate 63 causes the paper 61 to change color. Thus, when the collector is at a point where the signal arriving at the detector 17 from the probe is in phase with that arriving at the detector through the wave guide 11, the point on the paper in contact with the marker 53 will be darkened. When the signals arriving at the detector are out of phase, the paper will remain light.

The probe structure is moved back and forth like a paint brush to scan the area which is of interest. The lines of motion need not conform to the phase-front lines. The probe may be moved manually, or any suitable mechanism may be used for driving it automatically over successive lines across the paper. The resulting record is shown in Figure 6. The interpretation of the record is the same as that of the record shown in Figure 5.

If the wavelength of the energy used is too long to provide a complete record on a conveniently small paper area, the probe and marker may be connected by a pantograph linkage as shown in Figure 3. The probe 65 is preferably of the type shown in Figure 4, and is supported at the end of the wave guide 23. A pair of levers 67 and 69 are pivotally connected to the wave guides 11 and 23 at points 71 and 73 respectively, and are pivoted together at the point 75. The marker 77 is supported at the point 75, and may be either of the type shown in Figure 2 or of the type shown in Figure 4. The operation of the system is the same as those already described, except that the motions of the marker 77 are reduced with respect to those of the probe 65, providing a record of smaller dimensions than the actual phase fronts.

Another useful application of the described systems is in the measurement of refractive index of a dielectric material. This is done by placing a sheet of the material between a radiator (for example, the horn 5) and the probe, and measuring the resulting displacement of a phase front. The refractive index R is $1+S/T$, where S is the phase displacement and T is the thickness of the sample. The dielectric constant C is equal to $R^2$.

By disconnecting the wave guide 11 from the detector 17, or closing the attenuator 15 to provide substantially complete cutoff, the system of Figure 1 can be used to plot field intensity patterns instead of phase front diagrams. The probe 25 marks points where the field intensity is the same, as indicated by equal readings of the meter 21. The same type of record can be produced by an electrical marker like that of Figure 4; points of equal field intensity are of equal darkness. An example of such a record is shown in Figure 7.

Variations of the structures shown here will be apparent to those skilled in the art. For some purposes small horns or open wave guides may be used for the pick-up probe. Concentric or parallel wire lines may be used instead of the wave guides. When the detector is replaced by a microphone the apparatus can be used to observe acoustic waves.

I claim as my invention:

1. A device for plotting phase fronts in a radiation field, including an energy collector movable within said field, a detector, means connecting said collector to said detector, said connecting means being of constant effective length, means providing reference energy like that of said field and of phase which is independent of the position of said collector, means applying said reference energy to said detector, and means indicating maxima and minima in the output of said detector; a marking device movable over a sheet of recording medium such as paper, and means mechanically connecting said marking device to said collector element to position said marking device in accordance with the position of said collector.

2. A device for plotting phase fronts in a radiation field, including an energy collector movable within said field, a detector, means connecting said collector to said detector, means providing reference energy like that of said field and of phase which is independent of the position of said collector, means applying said reference energy to said detector, and means indicating maxima and minima in the output of said detector; a marking device movable over a sheet of recording medium such as paper, and means to position said marking device in accordance with the position of said collector.

3. A device as described in claim 1, with means for scanning a portion of space with said collector.

4. A device for plotting phase fronts in a radiation field, including an energy collector movable within said field, a detector, means connecting said collector to said detector, said connecting means being of constant effective length, means providing reference energy like that of said field and of phase which is independent of the position of said collector, and means applying said reference energy to said detector; a marking device movable over a sheet of recording medium such as paper and responsive to output from said detector to mark said medium, and means mechanically connecting said marking device to said collector element to position said marking device in accordance with the position of said collector.

5. A device for plotting phase fronts in a radiation field, including an energy collector and means for moving said collector to scan said field, a detector, means connecting said collector to said detector, said connecting means being of constant effective length, means providing reference energy like that of said field and of phase which is independent of the position of said collector, and means applying said reference energy to said detector; a marking device movable over a sheet of recording medium such as paper and responsive to output from said detector to mark said medium, and means mechanically connecting said marking device to said collector element to position said marking device in accordance with the position of said collector.

6. A device for plotting phase fronts in a radiation field, including an energy collector probe movable within said field, a detector, means connecting said collector to said detector, said connecting means being of constant effective length, means providing reference energy like that of said field and of phase which is independent of the position of said collector, means applying said reference energy to said detector, and means indicating maxima and minima in the output of said detector; and a marking device substantially concentric with said probe and movable therewith over a sheet of recording medium such as paper.

7. A device as described in claim 1, wherein said means applying said reference energy to said detector includes an adjustable attenuator.

8. A device as described in claim 1, wherein said means connecting said collector to said detector includes a phase shifting device.

9. A recording device to produce a record on an element having a face for receiving said record, and comprising a radio frequency antenna, a hollow tubular conductor, and a marking device including a rod extending within said conductor and longitudinally movable therein, said rod being electrically connected to said antenna and having an exposed stylus-like portion applied to said element face to make the record thereon.

HARLEY IAMS.

REFERENCES CITED

The following references are of record in the file of this patent:

UNITED STATES PATENTS

| Number | Name | Date |
| --- | --- | --- |
| 1,525,177 | Goldschmidt | Feb. 3, 1925 |
| 1,972,388 | Mack | Sept. 4, 1934 |
| 2,106,713 | Bowen | Feb. 1, 1938 |
| 2,106,771 | Southworth | Feb. 1, 1938 |
| 2,202,634 | Mack | May 28, 1940 |
| 2,406,406 | Sandretto | Aug. 27, 1946 |
| 2,407,267 | Ginzton | Sept. 10, 1946 |
| 2,415,807 | Barrow | Feb. 18, 1947 |